United States Patent
Zhao et al.

(10) Patent No.: US 12,410,315 B2
(45) Date of Patent: Sep. 9, 2025

(54) BIODEGRADABLE AIR FILTERING FILM AND METHOD FOR MANUFACTURING SAME

(71) Applicant: 4C Air, Inc., Sunnyvale, CA (US)

(72) Inventors: Mervin Zhao, Sunnyvale, CA (US); Wang Xiao, Sunnyvale, CA (US)

(73) Assignee: 4C Air, Inc., Sunnyvale, CA (US)

( * ) Notice: Subject to any disclaimer, the term of this patent is extended or adjusted under 35 U.S.C. 154(b) by 560 days.

(21) Appl. No.: 17/547,939

(22) Filed: Dec. 10, 2021

(65) Prior Publication Data

US 2023/0183473 A1 Jun. 15, 2023

(51) Int. Cl.
| | |
|---|---|
| *C08L 67/04* | (2006.01) |
| *B01D 39/16* | (2006.01) |
| *B01D 46/54* | (2006.01) |
| *B01D 69/10* | (2006.01) |
| *B01D 71/48* | (2006.01) |
| *B32B 5/02* | (2006.01) |
| *B32B 5/26* | (2006.01) |

(52) U.S. Cl.
CPC .......... *C08L 67/04* (2013.01); *B01D 39/1623* (2013.01); *B01D 46/543* (2013.01); *B01D 69/10* (2013.01); *B01D 71/48* (2013.01); *B32B 5/022* (2013.01); *B32B 5/277* (2021.05); *B01D 2239/0266* (2013.01); *B01D 2239/0631* (2013.01); *B01D 2239/1233* (2013.01); *B32B 2262/0276* (2013.01); *B32B 2262/0284* (2013.01); *B32B 2307/7163* (2013.01); *B32B 2571/00* (2013.01)

(58) Field of Classification Search
CPC .. B01D 39/083; B01D 46/0028; A62B 17/00; A62B 23/02
See application file for complete search history.

(56) References Cited

U.S. PATENT DOCUMENTS

| | | | | |
|---|---|---|---|---|
| 2003/0035943 | A1* | 2/2003 | Jones | B32B 5/245 |
| | | | | 428/317.9 |
| 2010/0038304 | A1* | 2/2010 | Chen | B01D 39/163 |
| | | | | 521/149 |
| 2021/0322907 | A1* | 10/2021 | Lagaron Cabello | B01D 39/083 |
| 2022/0176283 | A1* | 6/2022 | Umebayashi | D01F 6/70 |

FOREIGN PATENT DOCUMENTS

| | | | | |
|---|---|---|---|---|
| CN | 103952783 A | * | 7/2014 | |
| WO | WO-2021111804 A1 | * | 6/2021 | ............... D01D 1/06 |

OTHER PUBLICATIONS

De Matos Costa et al. (Properties of biodegradable films based on poly (butylene succinate) (PBS) and poly (butylene adipate-co-terephthalate)(PBAT) blends. Polymers, 12(10), 2317.) (Year: 2020).*
WO2021111804A1_ENG (Espacenet machine translation of Hirano) (Year: 2021).*
CN103952783A_ENG (Espacenet machine translation of Pan) (Year: 2014).*

* cited by examiner

*Primary Examiner* — Jonathan Miller
(74) *Attorney, Agent, or Firm* — Sheppard Mullin Richter & Hampton LLP; Xin Xie (57) ABSTRACT

A filtering film includes a porous substrate and a membrane disposed on the porous substrate. The membrane includes a plurality of fibers of one or more bio-degradable materials. The fibers have an average diameter of about 50 nm to about 3 μm. The one or more bio-degradable materials has a melt flow index of at least 5 g/10 min at 210° C. at a load of 2.16 kg.

20 Claims, 4 Drawing Sheets

BIODEGRADABLE AIR FILTERING FILM AND METHOD FOR MANUFACTURING SAME

BACKGROUND

Since the coronavirus pandemic, people have been depending on disposable masks as a protection against the virus. This has created an environmental crisis as numerous disposable masks are made from polypropylene (PP), which is a petroleum-based plastics and takes more than hundreds of years to decompose in the environment. There is a genuine need to develop more sustainable, environmentally friendly, and industrially compostable air filters.

SUMMARY

Described herein are air filtering films for masks and other air filters, and methods for manufacturing the air filtering films.

In one aspect, a filtering film includes a porous substrate and a membrane disposed on the porous substrate. The membrane includes a plurality of fibers of one or more bio-degradable materials. The fibers have an average diameter of about 50 nm to about 300 nm. The one or more raw bio-degradable materials/precursors has a melt flow index of at least 5 g/10 min at 210° C. at a load of 2.16 kg.

In some embodiments, the one or more bio-degradable materials include polylactic acid.

In some embodiments, the one or more bio-degradable materials further include one or more of polybutylene adipate terephthalate, polycaprolactone, and polyethylene oxide.

In some embodiments, the porous substrate includes a mesh or a nonwoven fabric.

In some embodiments, the porous substrate also includes the one or more bio-degradable materials.

In some embodiments, the membrane further includes microbeads connected with the fibers. In some embodiments, at least one of the microbeads has an average major axis length of 2-7 μm and an average minor axis length of 1-3 μm. In some embodiments, at least one of the microbeads has an average diameter of 3-5 μm.

In another aspect, an air filter is provided to include the filtering film. The air filter includes a first support film and a second support film. The filtering film is interposed between the first support film and the second support film.

In another aspect, the disclosure describes a method for manufacturing a filtering film. The method includes providing a porous substrate and electrospinning a membrane on the substrate with one or more bio-degradable materials that have a melt flow index of at least 5 g/10 min at 210° C. at a load of 2.16 kg, to form the filtering film.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION OF EMBODIMENTS

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Filtration materials for respirators or high quality-factor (Q) and high efficiency (such as those used in N95 respirators) filters are a typically made from plastic-based nano or micro-fibers. These plastic-based nano- or micro-fibers are produced by a variety of methods, such as melt-blowing, electrospinning, blow spinning, hydrothermal reactions, extrusions, etc. In applications such as personal respirators or HVAC devices (including various types of ventilation filters and air purifiers), these fibers can significantly increase their quality factor with an electrostatic injection. For example, the filtration layer in N95 respirators is made by meltblown PP fibers treated with a corona discharge.

Although PP and glass fibers are by far the most common used material for filtration, nearly all known high-efficiency filtration materials are used as disposables and end in the landfill. The typical life of a disposable respirator is about 8 hours of use, and many heating, ventilation, and air conditioning (HVAC) type filters are only supposed to be used for about one year. Since these synthetic fibers are derived from traditional plastics, not bio-plastics, they will remain in the soil for effectively more than hundreds of years. In addition, these materials are olefin based, so they are made from petroleum and not sustainable, or they are based off non-renewable resources.

Thus far, there are traditional materials such as cellulose which are sustainable filters, but they cannot be used in high efficiency filtration applications and have very poor quality-factor, as their pressure (air pressure drop) is relatively high for the amount of filtration efficiency they provide. Traditional cellulose fibers are made from the pulp of trees and then processed into filtration media via the "wet-laid" process, i.e., papermaking. Cellulose media is typically composed of micron-sized fibers but packed relatively densely due to the wet-laid process, which leads to high air pressure drop.

The techniques disclosed herein provide high-efficiency, high quality-factor biodegradable filtration media for the first time. The disclosed filtration media include nanofibers of such produced by electrospinning and other suitable methods as will be explained herein. The disclosed filtration media can be incorporated into products, such as personal air respirators, HVAC filters, air purifiers, personal protection equipment (PPE), etc.

Figure 1A:
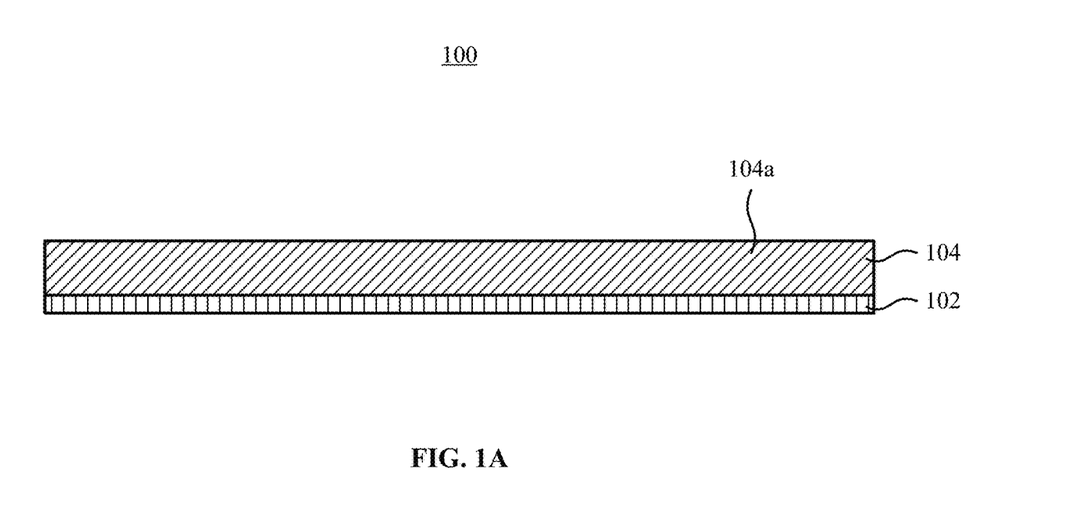
FIG. 1A is a schematic diagram illustrating a cross-section view of a filtering film, according to one example embodiment.
Figure 1B:
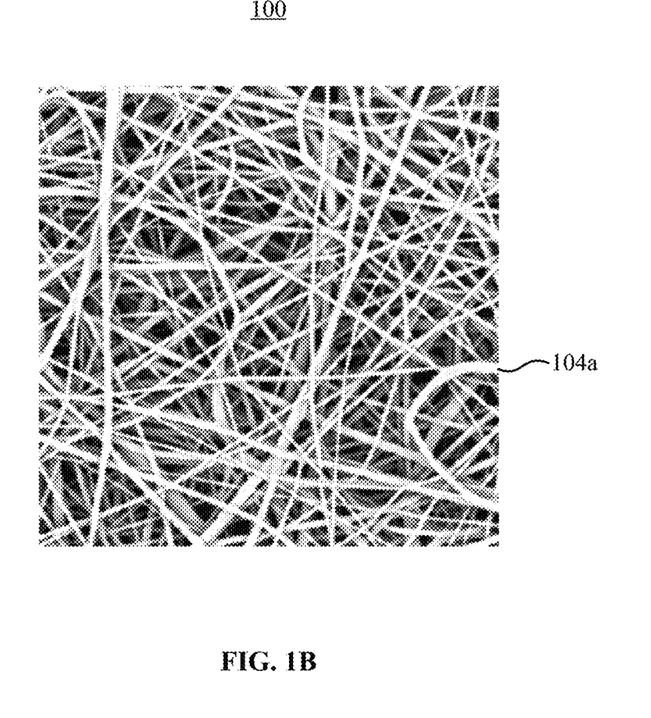
FIG. 1B is a scanning electron microscopic (SEM) image illustrating a plan-view of the filtering film illustrated in FIG. 1A.

Embodiments will now be explained with accompanying figures. Reference is first made to FIGS. 1A and 1B. FIG. 1A is a schematic diagram illustrating a cross-section view of a filtering film 100, according to one example embodiment. FIG. 1B is a scanning electron microscopic (SEM) image illustrating a plan-view of the filtering film 100. The breathable film 100 includes a porous substrate 102 and a membrane 104 disposed on the porous substrate 102.

In some embodiments, the membrane 104 includes fibers 104a made of one or more bio-degradable materials. In the conventional art, the electrostatic injection is critical for most fibers to achieve high filtration efficiency. However, bio-degradable plastics and materials including plastics and/or materials derived from plants that can be degraded by microbial activity under certain conditions) generally cannot sustain injected electric charges. This is because biodegradable materials require functional groups which make them more hydrophilic, so that they can be degraded by microbial activities. Hydrophilic materials cannot sustain an injected electric charge, because ambient water vapor can adsorb onto the surface of the material and screen any injected charge (thus "neutralizing" the material).

The disclosed techniques solve these problems by selecting suitable bio-degradable materials and processing the bio-degradable materials into desired structures.

In one aspect, the disclosed techniques decrease the diameter of the fibers 104a and rely primarily on the mechanical filtration mechanism. By decreasing the fiber diameter, the ratio of surface-area to volume can be dramatically increased compared with traditional micron-sized fibers. But there is no reliable report on the viability of using bio-degradable materials (e.g., bioplastics) for high efficiency filtration because the structural integrity and mechanical strength (including ductility, elasticity, etc.), melting point, water solubility, dipole moment, post-processability, are not well investigated.

By the disclosed techniques, the adsorption of particles in the air by the fibers 104a can be increased and a variety of other filtration mechanisms are impacted positively.

In another aspect, the disclosed techniques select suitable bio-degradable materials to a membrane having fibers. Several factors are taken into consideration for selecting suitable bio-degradable materials for the fibers 104a. First, water soluble bio-degradable materials, such as poly(vinyl alcohol) (PVA) and polyethylene oxide (PEO), cannot be used for filtration because they will dissolve under use. Second, suitable bio-degradable materials would not be able to have a low melting point because they have to be able to pass some safety standards. This would exclude polycaprolactone (PCL), polybutylene succinate (PBS), and protein-based materials such as chitosan.

In some embodiments, the one or more bio-degradable materials for the fibers 104a may include polylactic acid (PLA). In some embodiments, the one or more bio-degradable materials may further include other materials to blend with PLA. For example, the one or more bio-degradable materials may further include one or more of polybutylene adipate terephthalate, polycaprolactone, and polyethylene oxide, and other suitable bio-degradable materials currently known or hereafter developed.

In some embodiments, to effectively turn the bio-degradable materials into the fibers 104a, the one or more bio-degradable materials have a melt flow index of at least 5 g/10 min at 210° C. at a load of 2.16 kg. In some embodiments, the one or more bio-degradable materials have a melt flow index of about 5, 6, 8, 10, 12, 14, 16, 18, 20, 30, 40, 50, 60, 70, 80, or above g/10 min at 210° C. at a load of 2.16 kg, or between any two of the above numbers. In some embodiments, other properties of the bio-degradable materials are contemplated, including molecular weight, polydispersity index, crystalline melting temperature, and/or peak melting temperature. For example, a molecular weight of the bio-degradable materials may influence solubility, rheology of the solution that is fed for electrospinning, and ultimately effects the fiber morphology, such as diameters of the fibers, beads, etc. Polydisperse solutions can change the electrospinning operating range due to the distribution of weights, affecting the processability window of the electrospinning. Polydisperse also affects the end morphology, such as diameters of the fibers, beads, etc. Crystalline melting temperature of a bio-degradable material affects processability window and use window of a final product. When the melting point is too low, the final product may not be used for filters, depending on safety standards.

In some embodiments, the fibers 104a of the membrane 104 may include other functional additives. For example, the fibers 104a of the membrane 104 may include salts, surfactants (rheology modifiers), crystallinity modifiers, pigments, stabilizers, nucleating agents, etc.

The fibers 104a of the membrane 104 are designed to be nanostructures or sub-micro structures to provide sufficient filtering capability. In some embodiments, the fibers 104a of the membrane 104 may have an average diameter in a range from about 50 nm to about 300 nm, from about 50 nm to about 250 nm, from about 50 nm to about 200 nm, from about 50 nm to about 150 nm, from about 10 nm to about 300 nm, from about 10 nm to about 250 nm, from about 10 nm to about 200 nm, from about 10 nm to about 150 nm, or 50 nm to about 3 μm. In some embodiments, the fibers of the membrane 106 may have an average diameter in a range between and including any two of the following: about 30 nm, about 32 nm, about 34 nm, about 36 nm, about 38 nm, about 40 nm, about 42 nm, about 44 nm, about 46 nm, about 48 nm, about 50 nm, about 52 nm, about 54 nm, about 56 nm, about 58 nm, about 60 nm, about 62 nm, about 64 nm, about 66 nm, about 68 nm, about 70 nm, about 72 nm, about 74 nm, about 76 nm, about 78 nm, about 80 nm, about 82 nm, about 84 nm, about 86 nm, about 88 nm, about 90 nm, about 92 nm, about 94 nm, about 96 nm, about 98 nm, about 100 nm, about 110 nm, about 120 nm, about 130 nm, about 140 nm, about 150 nm, about 160 nm, about 170 nm, about 180 nm, about 190 nm, about 200 nm, about 210 nm, about 220 nm, about 230 nm, about 240 nm, about 250 nm, about 260 nm, about 270 nm, about 280 nm, about 290 nm, about 300 nm, about 310 nm, about 320 nm, about 330 nm, about 340 nm, about 350 nm, about 360 nm, about 370 nm, about 380 nm, about 390 nm, about 400 nm, about 500 nm, about 600 nm, about 700 nm, about 800 nm, about 900 nm, about 1 µm, about 1.5 µm, about 2 µm, about 2.5 µm, and about 3 µm, In some embodiments, to provide effective filtration, a thickness of the membrane 104 is particularly designed. If the thickness of the membrane 104 is too thick, while it may have a high particulate removal rate, it may nonetheless produce a large air pressure drop, reducing the quality factor of the final filtering film 100. Further, when a thickness of the membrane 104 is not sufficiently thick, the particulate removal rate of the filtering film 100 may suffer. Against these considerations, in some embodiments, the membrane 104 may have has a thickness of less than 30 µm, less than 25 µm, less than 20 µm, less than 15 µm, less than 10 µm, less than 8 µm, less than 6 µm, less than 4 µm, less than 2 µm, down to 1 µm, or between any two of the above numbers.

In some embodiments, the porous substrate 102 may be a mesh, a nonwoven fabric, or other porous structures that can provide support for the fibers 104a. The porous substrate 102 may be made of one or more bio-degradable materials. For example, the porous substrate 102 may include PLA. In some embodiments, the porous substrate 102 may further include other materials to blend with PLA. For example, the porous substrate 102 may further include one or more of polybutylene adipate terephthalate, polycaprolactone, and polyethylene oxide, and other suitable bio-degradable materials currently known or hereafter developed.

In some embodiments, an average pore size of the pores of the porous substrate 102 is larger than that of the fiber network of the fibers 104a. For example, an average pore size of the pores of the porous substrate 102 may be 10-100 µm. In some embodiments, the porous substrate 102 is a PLA-based nonwoven spunbond with fibers having an average diameter of approximately 10-20 µm. In some embodiments, an average pore size of the pores of the fiber network of the fibers 104a may be about 0.5-5 µm.

In some embodiments, the filtration efficiency of the filtering film 100 is at least 30%. In some embodiments, the filtration efficiency of the filtering film 100 is more than or about 40%, 50%, 60%, 70%, 80%, 90%, 93%, 95%, 98%, 99%, 99.5%, or between any two of the above numbers.

In some embodiments, the filtering film 100 has an air pressure drop of about 100 Pa under an air velocity of 14 cm/s. In some embodiments, the filtering film 100 may have an air pressure drop of about 100-120 Pa, 100-150 Pa, 100-175 Pa, or 100-200 Pa. In some embodiments, the filtering film 100 may have an air pressure drop of less than 50 Pa, 60 Pa, 70 Pa, 80 Pa, 90 Pa, 100 Pa, 120 Pa, 140 Pa, 160 Pa, 180 Pa, 200 Pa, or between any two of the above numbers.

In some embodiments, the filtering film 100 has a quality factor of about 10-30/kPa. The quality factor is defined as Q=−ln(1-Filtration Efficiency/100)/Air Pressure Drop). In some embodiments, the filtering film 100 has a quality factor of about 10, 15, 20, 23, 26, or 30/kPa, or between any two of the above numbers.

Figure 2A:
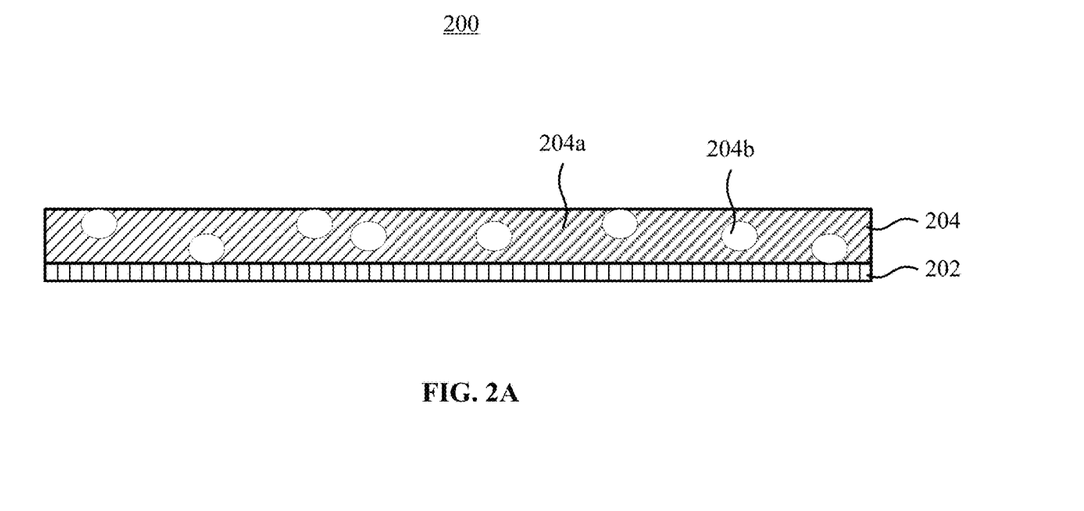
FIG. 2A is a schematic diagram illustrating a cross-section view of another filtering film, according to one example embodiment.
Figure 2B:
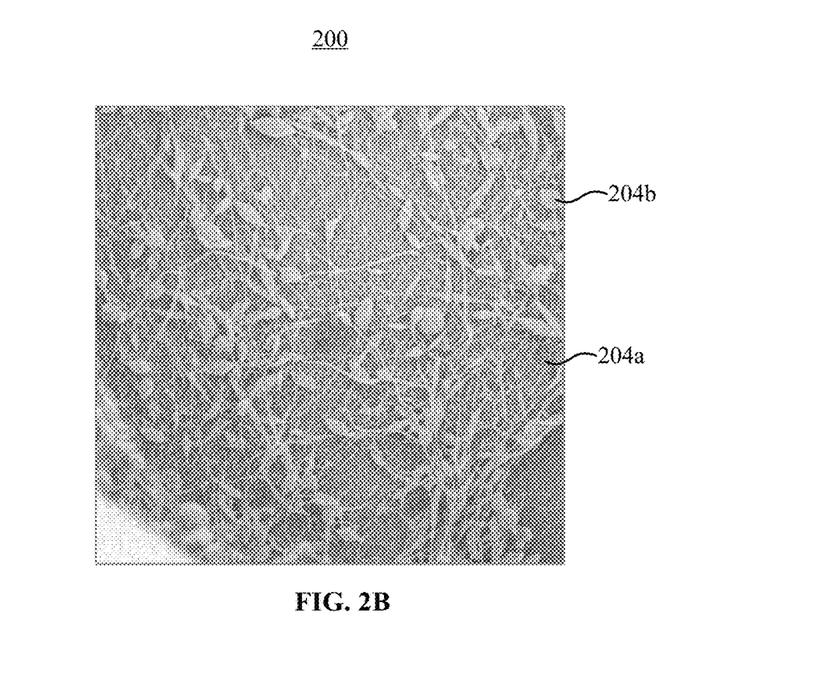
FIG. 2B is an SEM image illustrating a plan-view of the filtering film illustrated in FIG. 2A.

Reference is now made to FIGS. 2A and 2B. FIG. 2A is a schematic diagram illustrating a cross-section view of a filtering film 200, according to one example embodiment. FIG. 2B is a SEM image illustrating a plan-view of the filtering film 200. The breathable film 200 includes a porous substrate 202 and a membrane 204 disposed on the porous substrate 202. The membrane 204 includes fibers 204a made of one or more bio-degradable materials. The porous substrate 202 and the membrane 204 are similar to the porous substrate 102 and the membrane 104 of FIGS. 1A and 1B except that in addition to fibers 204a, the membrane 204 further include microbeads 204b connected to the fibers 204a. The microbeads 204b connected in the fiber network of the fibers 204a can strengthen the fiber network and improve the structure integrity of the fiber network. In some embodiments, the membrane 204 is a three dimensional (3D) network due to the existence of the microbeads 204b, which increase porosity and volume of the membrane 204 without increasing a density of the fibers 204a. The microbeads 204b may be in various shapes, such as sphere, ellipsoid, or other random shapes. In some embodiments, at least one of the microbeads has an average major axis length of 2-7 µm and an average minor axis length of 1-3 µm. In some embodiments, at least one of the microbeads has an average diameter of 3-5 µm. In some embodiments, the microbeads 204b is about 10-50% by volume of the total fiber network including the fibers 204a and microbeads 204b.

In some embodiments, the filtering films 100 and 200 may be prepared by an electrospinning method. Other methods to form the filtering films 100 and 200 are contemplated. For example, the filtering films 100 and 200 may be prepared with a sub-micron melt spinning method, a solvent-based blow spinning method, etc.

Figure 3:
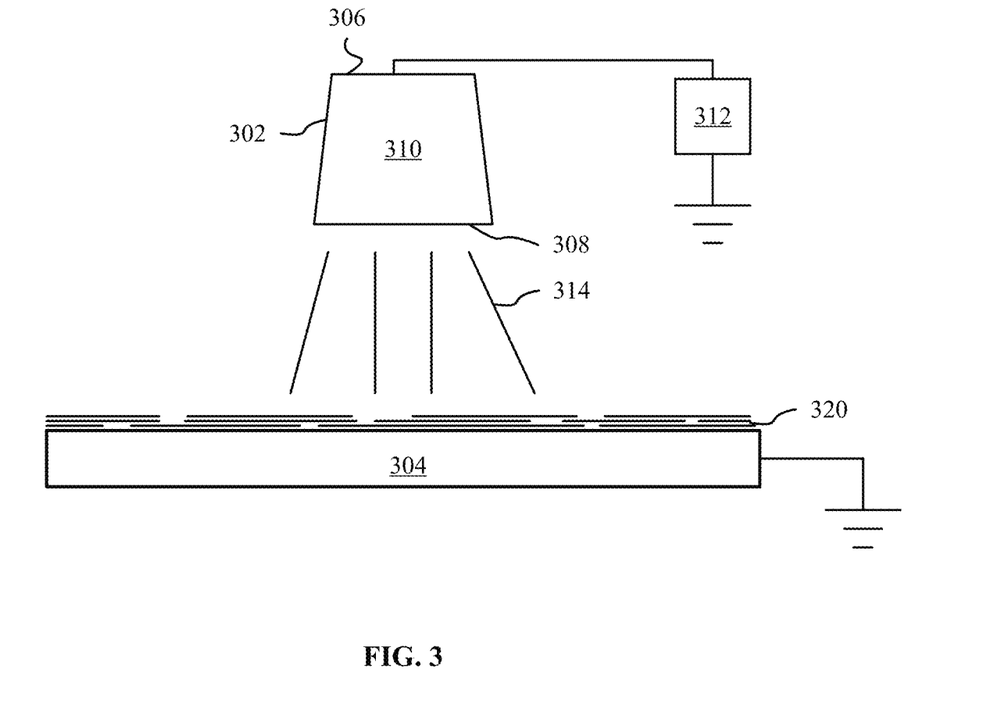
FIG. 3 is a schematic diagram illustrating an electrospinning method to form a filtering film, according to one example embodiment.

Methods for forming a filtering film (e.g., the filtering films 104 and 200) are further explained herein. Reference is made to FIG. 3. FIG. 3 is a schematic diagram illustrating an electrospinning method to form a filtering film, according to one example embodiment. To perform an electrospinning method to form a filtering film, at least one dispensing element 302 is provided. An example electrospinning method could be performed with one or more spinnerets. An dispensing element 302 may be referred to a component configured to dispense/extrude a material to be formed into a fiber. In some embodiments, the material to be formed into a fiber exits, or is drawn from, the dispensing element 302 toward a porous substrate 304.

In the illustrated embodiment, the material to be formed into a fiber may include one or more one or more bio-degradable materials. These bio-degradable materials may include one or more of PLA, polybutylene adipate terephthalate, polycaprolactone, and polyethylene oxide, and other suitable bio-degradable materials currently known or hereafter developed.

The dispensing element 302 may comprise a first surface 306 in fluid communication with a first source of a material (e.g., a polymer solution or polymer melt) to be formed into fibers, and a second, opposing surface 308 from which the material is extruded. In some embodiments, the dispensing element 302 may also include at least one chamber or outlet 310 extending between the first surface 306 and the second surface 308, through which the material to be formed into a fiber may pass.

A power source 312 may be operatively coupled to the dispensing element 302 and configured to supply a voltage thereto. In some embodiments, the voltage applied thereto is about 10-100 kV. When a sufficiently high voltage is applied to a liquid droplet formed near the second surface 308 of the dispensing element 302, the body of the liquid becomes charged. Electrostatic repulsion counteracts the surface tension such that the droplet is stretched, and, at a critical point, droplets or a stream of liquid 314 erupts from the second surface 308. In some embodiments, the second surface 308 may include one or more nozzles/spinnerets to form the droplet(s) or liquid stream(s). In some embodiments, the material supplied to the one or more nozzles/spinnerets to form the droplet(s) or liquid stream(s) is about 1-2 ml/hour per spinneret. A distance between the second surface 308 and the porous substrate 304 is about 10-30 cm. The electrospinning method is performed at room temperature (about 25° C.) at a humidity between 30-60% RH for about 10-30 minutes.

In some embodiments, multiple dispensing elements 302 may be employed for the electrospinning method, and each of the second surfaces 308 of the dispensing elements 302 may include one or more nozzles/spinnerets.

In some embodiments, a needleless spinning method may be employed to produce form a filtering film. The needleless spinning method includes dipping or passing a moving element through a polymer reservoir that contains the melt or solution of one or more bio-degradable materials. A voltage is applied to the picked up polymers on the moving element to form fibers.

In some embodiments, the molecular cohesion of the liquid is sufficiently high, stream breakup does not occur (if stream breakup does occur, droplets are electrosprayed) and a charged liquid jet is formed. As the jet dries in flight, the mode of current flow changes from ohmic to convective as the charge migrates to the surface of the fibers 314. The jet is then elongated by a whipping process caused by electrostatic repulsion initiated at small bends in the fibers 314, until they are finally deposited on the porous substrate 304, which is connected to ground. In some embodiments, the elongation and thinning of the fibers 314 resulting from this bending instability leads to the formation of uniform fibers with nanometer-scale or sub-micrometer-scale diameters. The fibers 314 may be directly accumulated on the porous substrate 304 to form a membrane 320.

Figure 4:
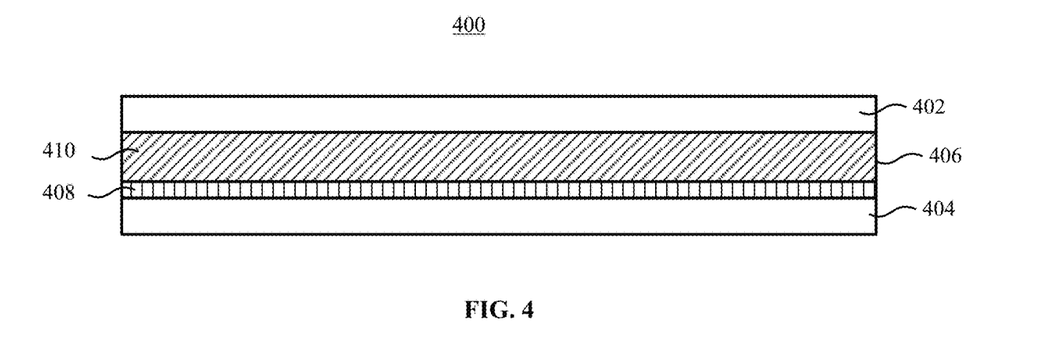
FIG. 4 is a schematic diagram illustrating an air filter, according to one example embodiment.

FIG. 4 is a schematic diagram illustrating an air filter 400, according to one example embodiment. The air filter 400 includes a first support film 402, a second support film 404, and a filtering film 406 interposed between the first support film 402 and the second support film 404. The filtering film 406 is similar to the filtering film 100 or 200 shown in FIGS. 1A, 1B, 2A, and 2B, and includes a porous substrate 408 and a membrane 410 that includes a 3D fiber network. The first support film 402 and the second support film 404 may be made of one or more bio-degradable materials, such as one or more of PLA, polybutylene adipate terephthalate, polycaprolactone, and polyethylene oxide, and other suitable bio-degradable materials currently known or hereafter developed. In some embodiments, the first support film 402 and the second support film 404 may be a porous PLA-spunbond film. In some embodiments, the porous substrate 408 may be omitted when the membrane 410 is directly formed on one of the first support film 402 and the second support film 404.

Figure 5:
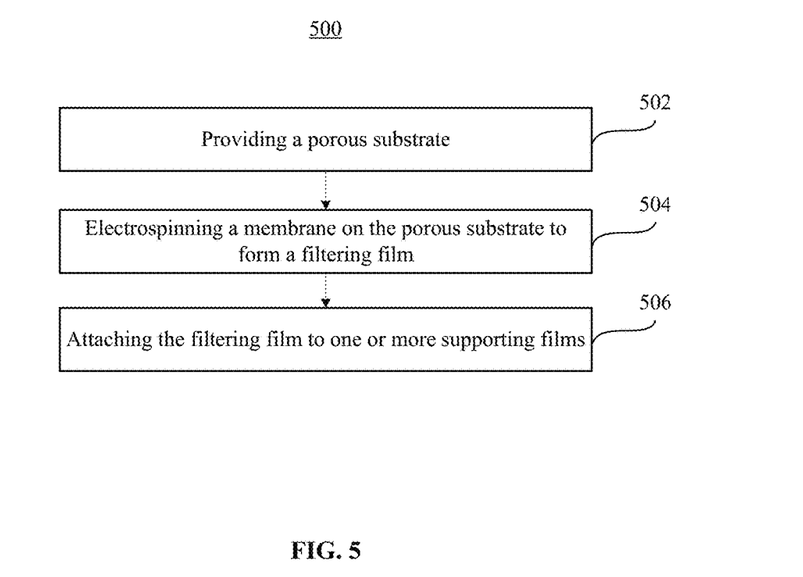
FIG. 5 is a flow chart illustrating a method for manufacturing an air filter, according to one example embodiment.

FIG. 5 is a flow chart illustrating a method 500 for manufacturing an air filter, according to one example embodiment. At 502, a porous substrate is provided or loaded for processing to form a filtering film. In some embodiments, the porous substrate is a nonwoven or mesh substrate. The porous substrate may comprise one or more bio-degradable materials. In one embodiment, the porous substrate comprises PLA. At 504, a 3D membrane is deposited on the porous substrate using an electrospinning technique. As described above, the electrospinning technique produces thin fibers from liquid/melt polymer(s). The fibers are extruded from an dispensing member and deposited/spun onto the porous substrate. At 506, the membrane/porous substrate formed at 502-504 is attached to one or more support films to form an air filter sheet. In some embodiments, a support film can be attached such that the membrane is sandwiched between the porous substrate and the support film. In some embodiments, the support film can be attached such that the porous substrate is sandwiched between the membrane and the support film. In some embodiments, two support films are attached such that the membrane/porous substrate are sandwiched between the two support films. The air filter sheet may then be processed to final air filters, such as respirators, masks, HVAC filters, etc.

The disclosed air filters may reach N95 grade to replace the conventional air filters made from conventional plastics. The disclosed air filters uses fewer materials thanks to nanotechnologies employed making the filtering fibers. The materials for the disclosed air filters are sustainable, non-petroleum based, industrially compostable (decomposed within 6 months), and can be recycled with other bioplastics. In addition, the cost of the bio-degradable materials is not impacted by fossil-fuel supply. As masks and respirators will continue to be a necessity with increasing pandemics, urbanization, fires, etc., the disclosed techniques can provide an alternative, environmental-friendly solution to conventional petroleum-based air filters.

EXAMPLES

The following examples are included to demonstrate specific embodiments of the disclosure. It should be appreciated by those of skill in the art that the techniques disclosed in the examples which follow represent techniques to function well in the practice of the disclosure, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the disclosure.

Example 1. Air Filter Performance

Various nanofiber sheets (similar to filtering films 100 and 200) are formed with a PLA spunbond support film and electrospun PLA fibers on the support film. The nanofiber sheets are subject to filtration efficiency tests using a test machine (TSI 8130A) that uses 0.3 micron charge-neutralized NaCl, 85 L/min. The following Table I summarizes the test results, where the quality factor Q is defined as Q=−ln (1-Filtration Efficiency/100)/Air Pressure Drop).

TABLE I

| Sample | Efficiency (%) | Pressure drop (Pa) | Quality Q (1/kPa) |
|---|---|---|---|
| As-form (flat sheet) | 98 | 150 | 26 |
| 1-month (flat sheet) | 99 | 200 | 23 |

TABLE I-continued

| Sample | Efficiency (%) | Pressure drop (Pa) | Quality Q (1/kPa) |
|---|---|---|---|
| IPA-discharged (flat sheet) | 90 | 150 | 15 |
| Shaped into a mask | 95 | 100 | 30 |

As shown in Table I, the as-formed nanofiber sheet has an air filtration efficiency of 98% with an air pressure drop of 150 Pa, that produces a quality factor of 26/kPa. After being stored at the same sheet ambient conditions for one month, the filtration efficiency of the nanofiber sheet is at 99% similar to that of the as-formed nanofiber sheet, but the air pressure drop increases to 200 Pa (due to multiple tests), resulting a decreased quality factor of 23/kPa. These test results demonstrate the effectiveness of the nanofiber sheet in filtration performance.

A comparison nanofiber sheet is treated with isopropyl Alcohol (IPA) to reduce charges on the nanofiber sheet. The IPA-treated nanofiber sheet has an air filtration efficiency of 90% with an air pressure drop of 150 Pa, that produces a reduced quality factor of 15/kPa. The results indicate that the IPA-treated nanofiber sheet formed by the disclosed techniques retains an effective filtration efficiency. This could be used when a nanofiber sheet is required to be sanitized to fulfill safety standards.

After the as-formed nanofiber sheet is processed into the shape of a mask, the test results show that the mask has an acceptable performance with an air filtration efficiency of 95%, an air pressure drop of 100 Pa, and a quality factor of 30/kPa.

Example 2. Decomposition

The example aims to demonstrate the disclosed filtering film is decomposable and could reduce the plastic pollution caused by conventional plastics-based air filter.

A mask as formed in example 1 and a conventional mask made with PP filters are subject to the same compost pile in an environmental chamber that is kept at 60° C. (to mimic the temperature generated from an industrial compost pile) and 100% RH (to decrease moisture loss). After 4 weeks, the PP mask shows no change while the PLA-based mask crumbles into particles no longer visible to the eye in the compost pile. The PLA-based mask is also able to pass a certain set of requirements set forth by ASTM D6400, ASTM D5338, or equivalent standard.

The filtering film formed with the techniques disclosed herein may reach a similar level of N95 grade and is bio-degradable to reduce its impact on the environment. The filtering film formed with the techniques disclosed herein uses fewer materials due to the nanotechnologies employed.

In a first aspect, the disclosed filtering film includes a porous substrate and a membrane disposed on the porous substrate. The membrane includes a plurality of fibers of one or more bio-degradable materials. The fibers have an average diameter of about 50 nm to about 300 nm. The one or more bio-degradable materials has a melt flow index of at least 5 g/10 min at 210° C. at a load of 2.16 kg.

In a second aspect, an air filter is provided to include the filtering film. The air filter includes a first support film and a second support film. The filtering film is interposed between the first support film and the second support film. In some embodiments, the porous substrate of the filtering film may be replaced by one of the support films.

In a third aspect, the disclosed techniques provide a method for manufacturing a filtering film. The method includes providing a porous substrate and electrospinning a membrane on the substrate with one or more bio-degradable materials that have a melt flow index of at least 5 g/10 min at 210° C. at a load of 2.16 kg, to form the filtering film.

The bio-degradable materials employed in the disclosed techniques may include PLA. In some embodiments, the bio-degradable materials may further include other materials to blend with PLA, such as one or more of polybutylene adipate terephthalate, polycaprolactone, and polyethylene oxide, and other suitable bio-degradable materials currently known or hereafter developed.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A filtering film, comprising:
   a porous substrate having an average pore size of 10-20 μm; and
   a membrane disposed on the porous substrate, the membrane comprising a plurality of nanofibers of one or more bio-degradable materials forming a fiber network, wherein the fiber network has an average pore size of 0.5-5 μm,
   wherein the average pore size of the porous substrate is greater than the average pore size of the fiber network;
   wherein the plurality of nanofibers have an average diameter of about 50 nm to about 3 μm,
   wherein the one or more bio-degradable materials have a melt flow index of between 5g/10 min and 6g/10 min at 210° C. at a load of 2.16 kg; and
   wherein the filtering film comprises an air pressure drop of between 100 Pascals and 120 Pascals under an air velocity of 14 centimeters per second.

2. The filtering film of claim 1, wherein the one or more bio-degradable materials comprise polylactic acid.

3. The filtering film of claim 2, wherein the one or more bio-degradable materials further comprise one or more of polybutylene adipate terephthalate, polycaprolactone, and polyethylene oxide.

4. The filtering film of claim 1, wherein the porous substrate comprises a mesh or a nonwoven fabric.

5. The filtering film of claim 1, wherein the porous substrate is made from one or more bio-degradable materials.

6. The filtering film of claim 5, wherein the one or more bio-degradable materials for the porous substrate comprise polylactic acid.

7. The filtering film of claim 6, wherein the one or more bio-degradable materials for the porous substrate further comprise one or more of polybutylene adipate terephthalate, polycaprolactone, and polyethylene oxide.

8. The filtering film of claim 1, wherein the membrane further comprises microbeads connected with the nanofibers.

9. The filtering film of claim 8, wherein the microbeads have an average major axis length of 2-7 μm and an average minor axis length of 1-3 μm.

10. The filtering film of claim 8, wherein the microbeads have an average diameter of 3-5 μm.

11. The filtering film of claim 1, wherein the filtering film has a quality factor of between 10 and 30 per kiloPascal, wherein the quality factor is defined as-ln(1-Filtration Efficiency/100)/Air Pressure Drop, wherein ln is a natural logarithm.

12. An air filter comprising:
one or more support films; and
a filtering film attached to the one or more support films, wherein the filtering film comprises:
a porous substrate having an average pore size of 10-20 μm; and
a membrane disposed on the porous substrate, the membrane comprising a plurality of nanofibers of one or more bio-degradable materials forming a fiber network, wherein the fiber network has an average pore size of 0.5-5 μm,
wherein the average pore size of the porous substrate is greater than the average pore size of the fiber network;
wherein the plurality of nanofibers have an average diameter of about 50 nm to about 3 μm,
wherein the one or more bio-degradable materials have a melt flow index of between 5g/10 min and 6g/10 min at 210° C. at a load of 2.16 kg, and
wherein the filtering film comprises an air pressure drop of between 100 Pascals and 120 Pascals under an air velocity of 14 centimeters per second.

13. The air filter of claim 12, wherein the one or more bio-degradable materials comprise polylactic acid.

14. The air filter of claim 13, wherein the one or more bio-degradable materials further comprise one or more of polybutylene adipate terephthalate, polycaprolactone, and polyethylene oxide.

15. The air filter of claim 12, wherein the porous substrate is made from one or more bio-degradable materials.

16. The air filter of claim 15, wherein the one or more bio-degradable materials for the porous substrate comprise polylactic acid.

17. The air filter of claim 16, wherein the one or more bio-degradable materials for the porous substrate further comprise one or more of polybutylene adipate terephthalate, polycaprolactone, and polyethylene oxide.

18. The air filter of claim 12, wherein the membrane further comprises microbeads connected with the nanofibers.

19. The air filter of claim 18, wherein the microbeads have an average major axis length of 2-7 μm and an average minor axis length of 1-3 μm.

20. The air filter of claim 18, wherein the microbeads have an average diameter of 3-5 μm.

* * * * *